(No Model.)
W. B. STEELE.
DRAFT EQUALIZER.
No. 311,042. Patented Jan. 20, 1885.
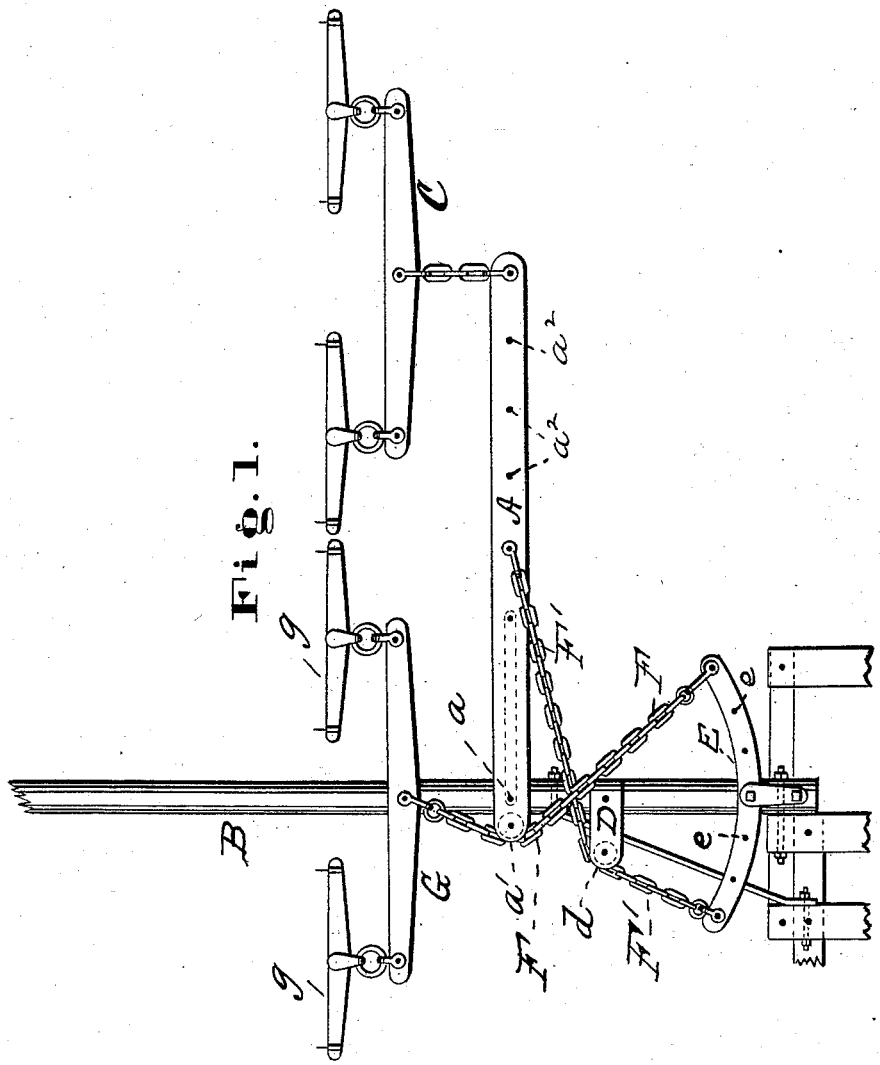
WITNESSES:
P. B. Turpin,
O. M. Kramer
INVENTOR:
William B. Steele
By R. S. & A. P. Lacey
Attys

UNITED STATES PATENT OFFICE.

WILLIAM B. STEELE, OF BERLIN, MINNESOTA.

DRAFT-EQUALIZER.

SPECIFICATION forming part of Letters Patent No. 311,042, dated January 20, 1885.

Application filed June 23, 1884. (No model.)

*To all whom it may concern:*

Be it known that I, WILLIAM B. STEELE, a citizen of the United States, residing at Berlin, in the county of Steele and State of Minnesota, have invented certain new and useful Improvements in Draft-Equalizers; and I do declare the following to be a full, clear, and exact description of the invention, such as will enable others skilled in the art to which it appertains to make and use the same, reference being had to the accompanying drawing, and to the letters and figures of reference marked thereon, which forms a part of this specification.

My invention relates to draft-equalizers; and it consists in novel construction, combination, and arrangement of parts, as will be hereinafter more fully described and claimed.

In the drawing I have represented my improvement in plan view. The main bar A is pivoted near its inner end at $a$ to the tongue B, and is extended slightly to the opposite side of said tongue, and provided at its extremity with an anti-friction guide-pulley, $a'$. The outer end of the main bar has the double-tree C secured to it, and said double-tree is fitted to hitch two horses, as shown. A series of openings, $a^2$, are formed at intervals along the main bar, so that the chain presently described may be attached at various points along the said bar. A bracket or short arm, D, is projected from the tongue slightly in rear of the main bar and on same side of the tongue with roller $a'$. The equalizing-bar E is pivoted midway its ends to the tongue in rear of the bracket before described, and is provided with a series of openings, $e$, so the point of pivot may be adjusted as desired. These openings may also serve to admit of the adjustment of the connection of the draft-chains F F'. The chain F is secured to the end of the bar E, which projects in the same direction with the main bar, and it is carried then forward around guide-pulley $a'$, and extends in advance of such pivot, and is secured to the double-tree G, which straddles the tongue, and has single-trees $g\ g$ on each end, so two horses may be hitched thereto—one on each side of the tongue. The chain F' is secured at one end to the equalizing-arm opposite chain F, and is carried thence around pulley $d$, thence crosses chain F, and is secured to the arm A. By adjusting the connection of chain F' toward the pivot end of the bar A, the lever thereof may be increased, and the opposite result may be accomplished by a reverse adjustment. This may be used to equalize the difference in strength of the teams attached to double-trees C G. It will also be seen that the points of connection of chains F F' with the equalizing-arm may be adjusted to assist in this equalization. By the pulleys $a'\ d$, which are arranged above the tongue, the chains are guided above the tongue, so that they will not bear thereon and impede the equalizing action and frictional wear of the tongue. I therefore prefer to employ bracket D and pulley $a'$, as described.

By my improvements it will be seen the arrangement of three horses on one side and one horse on the other side of the tongue is rendered practical, and all side draft is overcome, and a simple practical and economical contrivance is provided.

Having thus described my invention, what I claim, and desire to secure by Letters Patent, is—

1. The combination of the main bar A, having double-tree C, the equalizing-bar E, and the chains or cords F F', secured each at one end of the bar E, and extended thence diagonally forward across the tongue and secured, the chain F' to bar A, and chain F to double-tree C, all arranged and operating substantially as set forth.

2. The combination of the tongue, the bar A, the roller $a'$, the double-tree G, bracket D, having roller $d$, equalizing-arm E, and chains F F', all arranged and operating substantially as set forth.

3. The combination, with the bar A, having roller $a'$, and the double-tree G, of the bracket D, having roller $d$, the arm E, and chains F F', substantially as set forth.

In testimony whereof I affix my signature in presence of two witnesses.

WILLIAM B. STEELE.

Witnesses:
    THEO. L. HATCH,
    H. A. BEERS.